United States Patent
Pavlin

(10) Patent No.: US 6,492,458 B1
(45) Date of Patent: Dec. 10, 2002

(54) POLYALKYLENEOXYDIAMINE POLYAMIDES USEFUL FOR FORMULATING INKS FOR PHASE-CHANGE JET PRINTING

(75) Inventor: Mark S. Pavlin, Savannah, GA (US)

(73) Assignee: Arizona Chemical Company, Jacksonville, FL (US)

(*) Notice: Subject to any disclaimer, the term of this patent is extended or adjusted under 35 U.S.C. 154(b) by 0 days.

(21) Appl. No.: 09/572,131

(22) Filed: May 16, 2000

(51) Int. Cl.[7] .................. C08L 77/00; C08L 77/06; C09D 11/10; C08G 69/28; C08G 69/40
(52) U.S. Cl. .................. 524/607; 524/606; 528/335; 523/160
(58) Field of Search .................. 523/160, 161; 524/606, 607; 528/332, 335, 563, 367, 422

(56) References Cited

U.S. PATENT DOCUMENTS

| | | | |
|---|---|---|---|
| 3,156,572 A | 11/1964 | Carlick et al. | 106/27 |
| 3,962,122 A | 6/1976 | Trial | 252/392 |
| 4,066,585 A | 1/1978 | Schepp et al. | 260/18 |
| 4,165,303 A | 8/1979 | Schlossman et al. | 260/22 |
| 4,218,351 A * | 8/1980 | Rasmussen | 528/326 |
| 4,233,170 A | 11/1980 | Genjida et al. | 252/73 |
| 4,452,922 A | 6/1984 | Speranza et al. | 521/137 |
| 4,735,746 A | 4/1988 | Speranza et al. | 252/524 |
| 4,751,272 A | 6/1988 | Okita et al. | 525/398 |
| 4,795,581 A | 1/1989 | Nieh et al. | 252/77 |
| 4,830,671 A | 5/1989 | Frihart et al. | 106/27 |
| 4,839,424 A | 6/1989 | Murabayashi | 525/92 |
| 4,871,804 A | 10/1989 | Murabayashi | 525/92 |
| 4,889,560 A | 12/1989 | Jaeger et al. | 106/27 |
| 4,914,162 A | 4/1990 | Leoni et al. | 525/420.5 |
| 4,946,933 A | 8/1990 | Speranza et al. | 528/339.3 |
| 4,978,709 A | 12/1990 | Taniguchi et al. | 524/606 |
| 5,053,484 A | 10/1991 | Speranza et al. | 528/338 |
| 5,086,162 A | 2/1992 | Speranza et al. | 528/339 |
| 5,091,572 A | 2/1992 | Speranza et al. | 564/139 |
| 5,093,382 A | 3/1992 | Speranza et al. | 521/157 |
| 5,118,785 A | 6/1992 | Speranza et al. | 528/347 |
| 5,120,600 A | 6/1992 | Suppiah | 428/323 |
| 5,124,412 A | 6/1992 | Catena et al. | 525/420.5 |
| 5,128,441 A | 7/1992 | Speranza et al. | 528/335 |
| 5,130,382 A | 7/1992 | Speranza et al. | 525/420 |
| 5,138,097 A | 8/1992 | Speranza et al. | 564/153 |
| 5,139,677 A | 8/1992 | Pasternak | 210/640 |
| 5,140,097 A | 8/1992 | Speranza et al. | 528/342 |
| 5,143,854 A | 9/1992 | Pirrung et al. | 436/518 |
| 5,178,646 A | 1/1993 | Barber, Jr. et al. | 51/298 |
| 5,191,006 A | 3/1993 | Matsumoto et al. | 524/310 |
| 5,194,638 A | 3/1993 | Frihart et al. | 554/47 |
| 5,236,996 A * | 8/1993 | Smith | 524/608 |
| 5,270,353 A | 12/1993 | Nakano et al. | 523/214 |
| 5,286,288 A | 2/1994 | Tobias et al. | 106/20 B |
| 5,324,812 A | 6/1994 | Speranza et al. | 528/338 |
| 5,342,918 A | 8/1994 | Howelton et al. | 528/318 |

(List continued on next page.)

FOREIGN PATENT DOCUMENTS

| | | |
|---|---|---|
| EP | 0 224 389 B1 | 6/1987 |
| EP | 0 378 878 A2 | 6/1988 |
| EP | 0 307 933 | 3/1989 |
| EP | 0 384 208 B1 | 8/1990 |
| EP | 0 451 954 A2 | 10/1991 |
| EP | 0 470 364 A2 | 2/1992 |
| EP | 0 483 054 A1 | 5/1992 |
| EP | 0 527 613 A2 | 2/1993 |
| EP | 0 566 755 B1 | 6/1996 |
| WO | WO 88/00603 | 1/1988 |
| WO | WO 90/05910 | 5/1990 |
| WO | WO 97/39151 | 10/1997 |

OTHER PUBLICATIONS

"Jeffamine® D–2000 Polyoxypropylenediamine," Huntsman Corporation, Houston, TX, 1994. [Regarding CAS Reg. No. 9046–10–0].

"Jeffamine® D–230 Polyoxypropylenediamine," Huntsman Corporation, Houston, TX, 1997. [Regarding CAS Reg. No. 9046–10–0].

"Jeffamine® D–400 Polyoxyproplyenediamine," Huntsman Corporation, Houston, TX, 1998. [Regarding CAS Reg. No. 9046–10–0].

"Jeffamine® EDR–148 Triethyleneglycoldiamine," Huntsman Corporation, Houston, TX, 1994. [Regarding CAS Reg. No. 929–59–9].

"XTJ–502 Poly(Oxyethylene)Diamine," Huntsman Corporation, Houston, TX, 1996. [Regarding CAS Reg. No. 65605–36–9].

Eastman Chemical Company—2000; http://www.eastman-.com/Product_Information/ProductHome.asp?Eastman-DotCom=True&Product=167. [Accessed Apr. 16, 2000].

Primary Examiner—Vasu Jagannathan
Assistant Examiner—Callie E. Shosho
(74) Attorney, Agent, or Firm—Seed Intellectual Property Law Group PLLC

(57) ABSTRACT

A compound of formula (1):

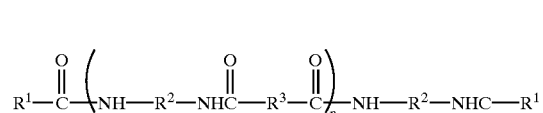

wherein, in at least one occurrence, $R^1$ is an alkyl group having at least seventeen carbons; $R^2$ includes a polyalkyleneoxide; $R^3$ includes a C6 carbocyclic group; and n is an integer of at least 1. A process for preparing a compound of the formula (1) comprising combining reactants comprising: (a) a monoacid compound of the formula $R^1$—COOH, or a reactive equivalent thereof; (b) a diamine compound of the formula $H_2N$—$R^2$—$NH_2$, or a reactive equivalent thereof; and (c) a diacid compound of the formula HOOC—$R^3$—COOH, or a reactive equivalent thereof; and heating reactants (a), (b) and (c) at a sufficient temperature, and for a sufficient time, to provide a reaction product that comprises a compound of formula (1). A process of printing, the process including melting a compound of formula (1) and depositing compound of formula (1) onto a substrate.

27 Claims, No Drawings

U.S. PATENT DOCUMENTS

| | | | |
|---|---|---|---|
| 5,350,789 A | 9/1994 | Sagawa et al. ............. | 524/313 |
| 5,455,309 A | 10/1995 | Albini et al. ............. | 525/420.5 |
| 5,455,326 A | 10/1995 | Parker ........................ | 528/335 |
| 5,500,209 A | 3/1996 | Ross et al. .................... | 426/66 |
| 5,585,057 A | 12/1996 | Trotta ......................... | 264/130 |
| 5,589,396 A | 12/1996 | Frye et al. .................... | 436/73 |
| 5,597,856 A | 1/1997 | Yu et al. ..................... | 524/227 |
| 5,618,911 A | 4/1997 | Kimura et al. ............. | 528/361 |
| 5,624,875 A | 4/1997 | Nakanishi et al. ............ | 501/39 |
| 5,645,632 A | 7/1997 | Pavlin .................... | 106/31.29 |
| 5,667,568 A | 9/1997 | Sacripante et al. ........ | 106/20 R |
| 5,770,680 A * | 6/1998 | Fischer et al. .............. | 528/310 |
| 5,804,682 A | 9/1998 | Fischer et al. .............. | 528/310 |
| 5,807,968 A | 9/1998 | Heinrich et al. ............ | 528/310 |
| 5,852,118 A | 12/1998 | Horrion et al. ............. | 525/90 |
| 5,869,596 A * | 2/1999 | Ahmed et al. ............... | 528/339 |
| 5,881,648 A | 3/1999 | Pavlin ........................ | 101/491 |
| 5,902,841 A | 5/1999 | Jaeger et al. ................ | 523/161 |
| 5,919,839 A | 7/1999 | Titterington et al. ........ | 523/161 |
| 5,922,114 A | 7/1999 | Sawada et al. .......... | 106/31.29 |
| 5,932,630 A | 8/1999 | Kovacs et al. ............. | 523/161 |
| 5,936,008 A | 8/1999 | Jones et al. ................ | 523/161 |
| 5,938,826 A | 8/1999 | Baker et al. ............. | 106/31.29 |
| 5,942,368 A | 8/1999 | Akiyama et al. ........... | 430/176 |
| 5,952,402 A | 9/1999 | Paine et al. ................. | 523/161 |
| 5,954,865 A | 9/1999 | Sawada ................... | 106/31.29 |
| 5,965,196 A | 10/1999 | Sawada ...................... | 427/161 |
| 5,966,150 A | 10/1999 | Lester et al. .................. | 347/43 |
| 5,969,003 A | 10/1999 | Foucher et al. ............. | 523/160 |
| 5,980,621 A | 11/1999 | Inaishi et al. ............ | 106/31.29 |
| 5,989,325 A | 11/1999 | Sacripante et al. ....... | 106/31.27 |
| 5,989,385 A | 11/1999 | Oeltjen et al. ........... | 156/330.9 |
| 5,994,453 A | 11/1999 | Banning et al. ............. | 524/590 |
| 5,997,765 A | 12/1999 | Furuta et al. ........... | 252/299.01 |
| 6,004,709 A | 12/1999 | Renfer et al. ............ | 430/58.65 |
| 6,018,005 A | 1/2000 | Banning et al. ............. | 525/457 |
| 6,022,909 A | 2/2000 | Meinhardt et al. .......... | 523/161 |
| 6,022,910 A | 2/2000 | Nishizaki et al. ........... | 523/161 |
| 6,028,138 A | 2/2000 | Hahn et al. ................. | 524/590 |
| 6,037,396 A | 3/2000 | Sawada ...................... | 524/231 |
| 6,042,227 A | 3/2000 | Meinhardt et al. ............. | 347/99 |
| 6,048,925 A | 4/2000 | Titterington et al. ........ | 524/590 |
| 6,059,870 A | 5/2000 | Taylor et al. ............ | 106/31.43 |
| 6,059,871 A | 5/2000 | Boils et al. ............... | 106/31.57 |
| 6,077,900 A * | 6/2000 | Boudreaux et al. ......... | 524/501 |
| 6,093,239 A | 7/2000 | Baker et al. ............. | 106/31.29 |
| 6,096,125 A | 8/2000 | Breton et al. ........... | 106/31.43 |
| 6,099,625 A | 8/2000 | Bradbury et al. ......... | 106/31.27 |
| 6,099,631 A | 8/2000 | Tregub et al. ........... | 106/31.85 |
| 6,100,315 A | 8/2000 | Kitamura et al. ........... | 523/160 |
| 6,103,809 A * | 8/2000 | Ahmed et al. ............... | 524/489 |
| 6,106,602 A | 8/2000 | Ouchi et al. ............ | 106/31.61 |
| 6,110,264 A | 8/2000 | Banning et al. ......... | 106/31.29 |
| 6,113,231 A | 9/2000 | Burr et al. .................. | 347/103 |
| 6,113,678 A | 9/2000 | Malhotra ................ | 106/31.29 |
| 6,117,223 A | 9/2000 | Malhotra ................ | 106/31.29 |
| 6,121,345 A | 9/2000 | Sawada ...................... | 523/160 |
| 6,132,500 A | 10/2000 | Inaishi .................... | 106/31.31 |
| 6,133,353 A | 10/2000 | Bui et al. ................... | 524/198 |
| 6,174,937 B1 | 1/2001 | Banning et al. ............ | 523/160 |

* cited by examiner

POLYALKYLENEOXYDIAMINE POLYAMIDES USEFUL FOR FORMULATING INKS FOR PHASE-CHANGE JET PRINTING

TECHNICAL FIELD OF THE INVENTION

The present invention relates to phase-change inks and polyamide components thereof having alkyleneoxy groups, as well as methods for printing with such inks.

BACKGROUND OF THE INVENTION

Hot-melt inks, also known as phase-change inks, are characterized by being solid at room temperature and molten at an elevated temperature at which the hot-melt ink is delivered to a substrate. Hot-melt inks are widely used in ink jet printing, and have also been suggested for use in flexographic, intaglio and gravure printing.

Ink jet printing is a well-known process for the non-contact printing of substrates such as paper, plastic films, metal foils and the like. In essence, ink jet printing ejects a stream of liquid ink through a very small orifice, and thereafter, at a certain distance from the orifice known as the breakup distance, the stream separates into minute uniformly-sized droplets. The ink droplets travel through the air until they hit a substrate, whereupon the ink forms an image on the substrate.

Various technologies have been developed to direct jet ink in an image-wise fashion from the printhead of a printing device to a substrate. In one technology, called drop-on-demand, the printhead passes over a substrate and ejects droplets of ink only when and where ink is desirably deposited on the substrate. Drop-on-demand technology is commonly employed in desktop ink jet printers.

In contrast, in a process known as continuous stream jet printing, the printhead is constantly ejecting ink droplets as it passes over a substrate, or as the substrate passes before the printhead. A guidance system is stationed between the printhead and the substrate, so ink droplets are directed either to a specific location on the substrate or to a recirculation gutter if the droplet being ejected should not be allowed to contact the substrate. A typical continuous stream ink jet printer employs inks that can be given an electric charge, and the guidance system is an electrostatic field that will interact with and direct the charged ink droplets to a desired location. Continuous stream jet ink printing is more commonly seen in industrial printing than in desktop printing.

Jet inks suitable for either drop-on-demand or continuous stream ink jet printing can be classified either as liquid jet inks or hot-melt (phase-change) jet inks. Either type of ink typically contains both colorant and carrier, where the carrier is a material that dissolves, suspends or otherwise disperses the colorant. A liquid jet ink is liquid at room temperature, and is typically at about room temperature while being stored in a printhead prior to being ejected. A simple liquid jet ink is composed of an aqueous carrier and a water-soluble dye as the colorant. After liquid jet ink contacts a substrate, the solvent typically evaporates or wicks away from the colorant, leaving the colorant visible at, and around, the site where the ink initially contacted the substrate.

In contrast, hot-melt jet ink is solid at room temperature, and is heated to a molten state prior to being ejected from an ink jet printhead. Upon contacting the substrate, which is typically at room temperature, the molten (i.e., liquid) hot-melt ink will cool and solidify, hence the origin of the term "phase-change" for these inks. A simple hot-melt ink is composed of wax as the carrier and a pigment or dye as the colorant. All, or nearly all, of the components of hot-melt ink remain at the site where the molten ink contacts the substrate, i.e., there is little or no wicking or evaporation of components in a hot-melt ink.

An ink composition useful in jet ink printing should have certain properties. It is highly desirable that the ink display a consistent breakup length, droplet viscosity, and at least in continuous stream jet printing, a constant droplet charge under the conditions employed during the jet ink printing process. To meet these requirements, the jet ink composition must have stable viscosity, stable resistance properties, and should not dry out (i.e., lose solvent or other volatile materials) upon aging.

A major problem with liquid jet inks arises because they contain substantial amounts of water and/or organic solvent, which evaporate upon standing so that these inks dry out and cake. This can cause blocking of the printhead orifice(s). A further problem is that loss of volatile solvent(s) causes the inks to increase in viscosity, which will cause substantial changes in the performance of the inks. Also, a porous substrate such as paper tends to cockle and/or distort when printed with high quantities of liquid jet ink. Furthermore, the organic solvents found in liquid jet ink can evaporate after contacting the substrate, and this may cause health problems for people located in the vicinity of the printing process.

Another problem associated with the presence of liquid solvents in liquid jet ink is that these solvents cause the colorant to bleed into the printed, typically porous substrate, with the consequence that the printing displays poor resolution. While specially coated porous substrates may overcome this problem, such special substrates are expensive and not generally necessary for other types of printing, e.g., reprographic printing, which work fine with "plain paper", i.e., standard non-coated sheet. At least in an office setting, it is highly desirable that all printing, including ink jet printing, be done on "plain paper" or standard transparencies.

Hot-melt inks offer a number of advantages over liquid inks. For example, when liquid ink is used to deposit colorant on a porous substrate, the colorant tends to be carried into the substrate as the liquid carrier wicks into the substrate. This causes a reduction in print density and some loss in print resolution. In contrast, the rapid solidification of hot-melt ink ensures that the colorant is fixed to the surface of the substrate, with a corresponding increase in print density and resolution. A further advantage is that there is little or no cockle associated with the printing of hot-melt inks, which is in distinct contrast to printing done with liquid inks. Still another advantage is that hot-melt inks are easier to transport without spillage than liquid inks.

For several reasons, the adhesion of colorant to a substrate may also be superior in hot-melt printing. For instance, because all of the carrier in a hot-melt ink stays with the colorant at the surface of the printed substrate, rather than evaporating or wicking away from the colorant as occurs in printing with liquid inks, a hot-melt carrier is better available to assist in fixing the colorant to the substrate's surface. Also, carriers that are solid at room temperature will naturally have better fixing properties than liquid carriers. Looking specifically at jet ink printing, hot-melt inks offer the advantage of having essentially no volatile components. Thus, there is no evaporation of components in a hot-melt ink, and so no corresponding problems with changes in ink viscosity, caking and health risks due to solvent evaporation.

To a significant extent, the properties of the carrier determine the properties of jet ink. The prior art discloses several materials that may be used as a carrier, sometimes also referred to as vehicle, binder or solid organic solvent, in hot-melt jet inks. U.S. Pat. No. 3,653,932 discloses to use diesters of sebacic acid (a solid linear $C_{10}$ dicarboxylic acid) and paraffinic alcohols having 12 or fewer carbons. U.S. Pat. No. 4,390,369 discloses to use natural wax. U.S. Pat. No. 4,659,383 discloses to use $C_{20-24}$ acids or alcohols. U.S. Pat. No. 4,820,346 discloses to use aromatic sulfonamides. U.S. Pat. No. 4,830,671 discloses to use short-chain polyamides. U.S. Pat. No. 5,151,120 discloses to use the ethyl ester of stearic acid (a solid linear, $C_{18}$ carboxylic acid). U.S. Pat. No. 5,354,368 discloses to use tall oil rosin. The foregoing are exemplary of the prior art directed to hot-melt ink carriers.

Despite the significant amount of research that has been done in the area of carriers for hot-melt inks, there remains a need in the art for superior carrier materials useful in hot-melt inks, and for inks having such carrier materials.

SUMMARY OF THE INVENTION

In one aspect, the present invention provides a compound of formula (1):

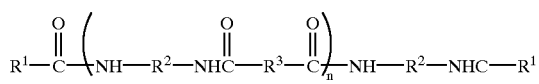

(1)

wherein, in at least one occurrence, $R^1$ is an alkyl group having at least seventeen carbons; $R^2$ includes a polyalkyleneoxide; $R^3$ includes a C6 carbocyclic group; and n is an integer of at least 1. In various aspects, $R^1$ is an alkyl group with at least 21 carbons; and/or $R^1$ includes at least 16 contiguous $CH_2$ groups; and/or $R^1$ has less than about 70 carbons; and/or $R^2$ includes units selected from ethyleneoxy and propyleneoxy; and/or $R^2$ has a formula weight of about 200 to 4000; and/or $R^3$ includes a C6 saturated carbocyclic group; and/or $R^3$ is 1,4-cyclohexylene; and/or n is an integer within the range of 1 to 10, inclusive; and/or $R^1$ includes at least 16 contiguous $CH_2$ groups, $R^2$ includes ethyleneoxy and/or propyleneoxy moieties (units), and $R^3$ is 1,4-cyclohexylene; and/or at no occurrence is $R^3$ the diradical formed when two carboxyl groups are removed from dimer acid; and/or $R^1$ is an alkyl group having at least seventeen carbons and at least 16 contiguous $CH_2$ groups, $R^2$ is a polyalkyleneoxide with alkylene termination at each of its two ends, $R^3$ is a 1,4-cyclohexylene group, and n is an integer of at least 1. In one aspect, the compound of the present invention has a melting point within the range of 50° C. to 150° C.

In another aspect, the present invention provides a composition that includes a compound according to formula (1), wherein (i) the composition has an acid number of less than 25, and an amine number of less than 10; and/or (ii) the composition has a viscosity of less than 300 centipoise when the composition is at a temperature of 150° C.; and/or (iii) the composition is free of, i.e., does not include, solvent having a boiling point of less than 150° C.; and/or (iv) the composition further includes an image-forming agent, where the image-forming agent may be a colorant.

In another aspect, the present invention provides a process for preparing a compound of the formula (1)

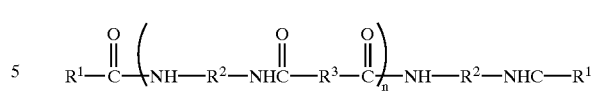

(1)

wherein, in at least one occurrence, $R^1$ is an alkyl group having at least seventeen carbons; $R^2$ includes a polyalkyleneoxide; $R^3$ includes a C6 carbocyclic group; and n is an integer of at least 1; the process including combining reactants, where the reactants include: (a) a monoacid compound of the formula $R^1$—COOH, or a reactive equivalent thereof; (b) a diamine compound of the formula $H_2N$—$R^2$—$NH_2$, or a reactive equivalent thereof; (c) a diacid compound of the formula HOOC—$R^3$—COOH, or a reactive equivalent thereof; and heating reactants (a), (b) and (c) at a sufficient temperature, and for a sufficient time, to provide a reaction product that includes a compound of formula (1).

In various aspects of the process, $R^1$ includes at least 16 contiguous $CH_2$ groups, $R^2$ includes ethyleneoxy and/or propyleneoxy moieties, and $R^3$ is a 1,4-cyclohexylene group; and/or dimer acid or a reactive equivalent thereof is not included among the reactants; and/or the process further includes removing unreacted reactant (a), (b) and/or (c) so that the reaction product has an acid number of less than 25 and an amine number of less than 10; and/or the reactants are characterized by a total equivalents of acid and a total equivalents of amine, and the total equivalents of acid are within 10% of the total equivalents of amine.

In another aspect, the present invention provides a composition prepared by a process disclosed herein. In various aspects, the process provides a composition having a viscosity of less than 300 centipoise when the composition is at a temperature of 150° C.; and/or having an image-forming agent.

In another aspect, the present invention provides a process of printing that includes melting a compound according to formula 1 and depositing the compound onto a substrate.

These and other related aspects of the present invention are disclosed in further detail herein.

DETAILED DESCRIPTION OF THE INVENTION

As briefly summarized above, the present invention provides compounds and compositions, which are useful as ink components, as well as methods of making the compounds, compositions and inks, and methods of printing with the compounds, compositions and inks.

In one aspect, the invention provides a compound of formula (1):

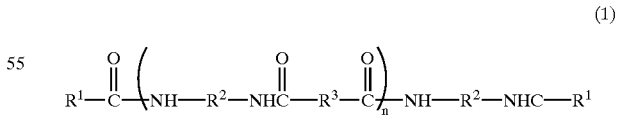

(1)

wherein, in at least one occurrence, $R^1$ is an alkyl group having at least seventeen carbons; $R^2$ includes a polyalkyleneoxide; $R^3$ includes a C6 carbocyclic group (i.e., a ring formed from exactly six carbons and no other atoms); and n is an integer of at least 1. In a preferred embodiment, $R^1$ is an alkyl group having at least seventeen carbons wherein at least 16 carbon atoms form a straight chain, i.e., $R^1$ includes at least 16 contiguous $CH_2$ groups. In a preferred embodiment, $R^2$ includes ethyleneoxy (—$CH_2CH_2O$—)

and/or propyleneoxy (ie., methyl-substituted ethyleneoxy) units. In a preferred embodiment, $R^3$ includes a saturated C6 carbocyclic group, where the carbocyclic group is preferably joined to flanking carbonyl groups at the 1 and 4 positions of the C6 carbocyclic group.

Because compounds of formula (1) may contain more than one repeating unit, the compounds may be referred to as polymeric, and a specific compound may be referred to as a polymer, a polyamide, or a polyalkyleneoxydiamine polyamide. A compound will contain at least four amide groups (—NH—C(=O)—), and may contain more than ten amide groups. A compound will also contain at least two ether groups (—C—O—C—) and may contain more than twelve ether groups. Accordingly, in formula (1), n=at least 1, may equal 1–10, or 1–20, or 1–30, or 1–40, or 1–50. Typically, a composition of the invention will contain a plurality of compounds of formula (1), wherein various members of the plurality will have different values of "n". However, because compounds of the invention typically have increased viscosity with increases in "n", in one aspect the present invention provides compounds wherein n is 1–10, or 2–10, or 3–10, or 4–10, or 5–10, etc.

In compounds of formula (1), $R^1$ is selected from alkyl groups, and particularly alkyl groups including at least 16 linear carbons. As used herein, an "alkyl" group refers to a saturated, straight or branched, hydrocarbon chain. Independently, in various embodiments, the alkyl group has zero branches (ie., is a straight chain or linear alkyl group), one branch, two branches, or more than two branches. As used herein, linear alkyl groups are saturated hydrocarbon groups that are formed from a chain of methylene (—CH$_2$—) groups.

The $R^1$ groups have at least 17 carbon atoms, where at least 16 of the carbons preferably form a straight chain, in order that the polyamide of formula (1), and compositions containing such polyamides, will have a sufficiently high softening point to be commercially advantageous in ink jet printing. In other words, the alkyl group will consist of a chain of sixteen repeating, i.e., contiguous, CH$_2$ groups. In general, and up to a certain point, as the number of carbon atoms in an $R^1$ group increases, a compound of formula (1) will tend to have a higher softening point. The incorporation of $R^1$ groups having less than 17 carbons, and/or having additional branching, will cause a polyamide to have a lower softening point. The polyamide of the present invention preferably has a softening point above about 50° C., in order that it is not tacky, and is easily handled without loosing its shape. When the softening point of a compound of the present invention (or a composition containing one of more of such compounds) falls below about 50° C., the compound or composition may melt and/or become tacky when exposed to elevated temperatures as may be experienced during storage or transport.

In one aspect, the $R^1$ groups each have more than 17 carbon atoms. In another aspect, the $R^1$ groups each have at least 19 carbons, and in other aspects, at least one of the $R^1$ groups in a polyamide of formula (1) has 24, 26, 28, 30, 32, 34, 36, 38, 40, 42, 44, 46, 48, 50 or more carbons. In one aspect, the $R^1$ groups each have 20–50 carbons atoms, while in another aspect the $R^1$ groups each have 30–50 carbon atoms.

The polyamides of formula (1) contain two $R^1$ groups, one at each end of the compound. The identity of $R^1$ at one occurrence is independent of the identity of $R^1$ at the other occurrence. For example, the $R^1$ groups in formula (1) may be a $C_{17}$ alkyl group (i.e., an alkyl group formed from 17 carbon atoms) at one end of the compound, and a $C_{33}$ alkyl group at the other end. In one aspect of the invention, the two $R^1$ groups in formula (1) are identical, or at least contain numbers of carbon atoms within a common specified range. For example, $R^1$ may include $C_{17-70}$ hydrocarbons. In this embodiment, the compounds contain $R^1$ groups that are formed from at least 17, but not more than 70, carbons.

In formula (1), $R^2$ is a diradical known as a polyalkyleneoxide or a polyoxyalkylene. As used herein, the term "polyalkyleneoxide" has its standard meaning in the art, and refers to a plurality (i.e., at least two) alkylene groups joined together by oxygen atoms. An alkylene group refers to a saturated hydrocarbon having two hydrogens removed, such as, for example, ethylene (—CH$_2$CH$_2$—), the diradical derived from the hydrocarbon ethane; propylene (—CH$_2$CH$_2$CH$_2$— or —CH(CH$_3$)CH$_2$—), which are the diradicals derived from the hydrocarbon propane; and butylene (—CH$_2$CH$_2$CH$_2$CH$_2$— and —CH(CH$_2$CH$_3$)CH$_2$— being two examples) diradicals derived from butane.

In general, the polyalkyleneoxide has the structure (—R$^4$—O—)$_m$R$^4$— wherein $R^4$ is an alkylene group and m is an integer. Thus, the polyalkyleneoxide group terminates, at each end, with an alkylene group. The polyalkyleneoxide groups of the present invention have at least three alkylene groups formed from at least six carbon atoms, which are linked together by at least two oxygen atoms. Generally, $R^4$ is independently selected at each occurrence, however, in one aspect of the present invention, $R^4$ is the same at each occurrence within an $R^2$ group. In one embodiment, $R^4$ has the formula —CHR$^5$—CH$_2$— where $R^5$ is selected from hydrogen and C1–C10 alkyl groups. In one aspect, $R^5$ is selected from hydrogen and C1–C5 alkyl groups, while in another aspect $R^5$ is selected from hydrogen and C1 (ie., methyl). In one aspect, each $R^4$ group in a polyalkyleneoxide group is hydrogen, so that the polyalkyleneoxide group is polyethyleneoxide. In another aspect, each $R^4$ group in a polyalkyleneoxide group is methyl, so that the polyalkyleneoxide group is polypropyleneoxide. As used herein, an $R^4$ group wherein $R^5$ is hydrogen, in combination with an adjacent oxygen atom, is called an ethyleneoxy group, while an $R^4$ group wherein $R^5$ is methyl, in combination with an adjacent oxygen atom, is called a propyleneoxy group.

In various aspects, the polyalkyleneoxide group has 6–50, 6–20, 6–16, 6–10, or 6 carbon atoms. The molecular weight of the polyalkyleneoxide group generally ranges from about 200 to about 4,000. A preferred polyalkyleneoxide group is a polyethyleneoxide group, having the structure —CH$_2$CH$_2$—(O—CH$_2$CH$_2$)$_p$— where p is an integer of at least one. Another preferred polyalkyleneoxide is a block copolymer of polyethyleneoxide and polypropyleneoxide groups.

In formula (1), $R^3$ represents a diradical that includes a C6 carbocyclic group. As shown in formula (1), $R^3$ is bonded directly to two carbonyl (C=O) groups. In compounds of the present invention, the C6 carbocyclic group is directly bonded to these two carbonyl groups. The two carbonyl groups are bonded to the C6 carbocyclic group in either the ortho- (ie., 1,2-dicarbonyl substitution), meta- (i.e., 1,3-dicarbonyl substitution) or para- (1,4-dicarbonyl substitution) configuration. In a preferred embodiment of the present invention, the two carbonyl groups are bonded to the C6 carbocyclic group in the para-configuration.

The ortho-, meta-, and para-nomenclature is commonly used in the scientific literature to denote substitution around a benzene nucleus. While the C6 carbocyclic group of the present invention may be a benzene nucleus, as used herein, a C6 carbocyclic group also refers to C6 cycloaliphatic groups having a partially or completely saturated benzene nucleus, where a completely saturated benzene nucleus is commonly known as a cyclohexane group. Thus, the $R^3$ group may be represented by the structure (2):

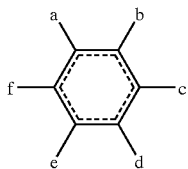

(2), where (i) the central C6 ring may be aliphatic, i.e. have zero, one or two double bonds, or may be aromatic, (ii) at least two of positions a, b, c, d, e, and f are the carbonyl groups shown within the structure

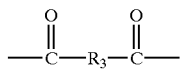

of formula (1), and (iii) the four positions of a, b, c, d, e, and f that are not occupied by carbonyl groups are independently substituted with groups selected from hydrogen and C1–C6 hydrocarbon groups.

In one aspect, the C6 carbocyclic group is para-substituted, also known as 1,4-disubstituted, with carbonyl groups. In another aspect, the C6 carbocyclic group is only para-substituted with carbonyl groups, i.e., the C6 ring is substituted with two adjacent pairs of hydrogen atoms, where the two pairs are separated by carbonyl groups. In another aspect, the C6 carbocyclic group is saturated. In a preferred embodiment, $R^3$ is 1,4-cyclohexylene, i.e., a C6 saturated carbocyclic group having carbonyl substitution at the 1 and 4 positions of the ring, and hydrogen substitution at all other positions of the ring.

As stated previously, in compounds of formula (1), in at least one occurrence, $R^1$ is an alkyl group having at least seventeen carbons; $R^2$ includes a polyalkyleneoxide; $R^3$ includes a C6 carbocyclic group (i.e., a ring formed from exactly six carbons and no other atoms); and n is an integer of at least 1. However, $R^1$ is not necessarily exclusively selected from groups having the foregoing definitions. Thus, at some occurrences, $R^1$, $R^2$ and $R^3$ may be organic groups, ie., carbon-containing groups, beyond the definitions provided above. Thus, the present invention relies on the discovery that in compounds of formula (1), the polyalkyleneoxide group imparts a low melting point, and a low melt viscosity, to the compound. This desirably low melt viscosity can be retained, with a surprising yet desirable increase in melting point, when a polyamide containing polyalkyleneoxide moieties also contains the C6 carbocyclic structure, preferably the 1,4-cyclohexylene group, and additionally terminal $R^1$ groups that are relatively long and contain a straight-chain segment. These desirable properties may be retained if less than 50 mol % of the $R^1$, $R^2$ and $R^3$ groups, preferably less than 40 mol %, preferably less than 30 mol %, preferably less than 20 mol %, preferably less than 10 mol % are selected from organic groups outside the definitions for $R^1$, $R^2$ and $R^3$ provided above.

In a preferred aspect of the present invention, all or essentially all of the $R^1$, $R^2$ and $R^3$ groups fall within the definitions that $R^1$ is an alkyl group having at least seventeen carbons; $R^2$ includes a polyalkyleneoxide; $R^3$ includes a C6 carbocyclic group; and n is an integer of at least 1. In a further preferred aspect of the present invention, $R^1$ is an alkyl group having at least seventeen carbons; $R^2$ is a polyalkyleneoxide with alkylene termination at each of its ends; $R^3$ is a C6 carbocyclic group, and preferably a 1,4-cyclohexylene group; and n is an integer of at least 1.

For example, while at least some of the $R^3$ groups in formula (1) include the C6 carbocyclic structure, some of the $R^3$ groups may be linear chains of 4 to 12 carbon atoms, i.e., may be linear $C_{4\text{-}12}$ hydrocarbon groups. Thus, some of the $R^3$ groups may have the structure $-(CH_2)_{4\text{-}12}-$ resulting from a chain of 4 to 12 methylene groups. The addition of some linear $C_{4\text{-}12}$ hydrocarbon $R^3$ groups in polyamides of formula (1) typically decreases the melting point of the compounds, and compositions containing same. The compounds and compositions of the invention preferably have a melting point of at least 50° C., and more preferably have a melting point in excess. of 100° C. Accordingly, if linear $C_{4\text{-}12}$ hydrocarbon groups are included as the $R^3$ portion of formula (1), such groups preferably constitute a minor number of such groups, ie., less than 50 mol % of the $R^3$ groups are linear $C_{4\text{-}12}$ hydrocarbon groups. In various aspects of the invention, less than 40 mol %, 30 mol %, 20 mol %, 10 mol %, and 5 mol %, of the $R^3$ groups, based on the total moles of $R^3$ groups, are linear $C_{4\text{-}12}$ hydrocarbon groups.

The present invention is directed to materials having a relatively high molecular weight but with a relatively low melt viscosity, while being a solid at room temperature. The present invention stems from the discovery that a component having this balance of properties is advantageously included in a hot melt (phase-change) printing ink. Furthermore, the present invention stems from the discovery that this balance of properties may be found in polyamides, and in particular polyamides having polyalkyleneoxide moieties, and in particular polyalkyleneoxide moieties and 1,4-disubstituted cyclohexyl moieties, and in particular polyalkyleneoxide moieties, 1,4-disubstituted cyclohexyl moieties and termination with a long-chain carbon group, preferably having at least 16 carbons in a straight unsubstituted chain.

The invention also provides compositions that include a plurality of compounds of formula (1), and/or a compound of formula (1) in admixture with one or more reactants used to prepare a compound of formula (1). As used herein, the term plurality means "at least two" where the "at least two" compounds have non-identical structures or molecular weights. Typically, when a compound of formula (1) is prepared by a preferred method as described in detail below, the compound will be formed in admixture with one or more other compounds of formula (1). This admixture is a composition of the present invention. In one preferred composition, all compounds will have the same $R^1$, $R^2$ and $R^3$ groups, however, they will have different values for "n". Thus, the composition may contain a mixture of compounds, which can be seen by, for example, gel permeation chromatography (GPC) or high pressure liquid chromatography (HPLC).

While a composition of the invention may contain at least two compounds of formula (1), it may contain additional compounds as well, including compounds of formula (1) wherein n is zero. Compositions of the invention typically include a mixture of polyamides of formula (1) in addition to, for example, by-products that are formed during the compound-forming reaction. While the polyamides of formula (1) may be purified from by-products and/or one another using, e.g., chromatography or distillation, the by-products are typically either minimal in amount or impart desirable properties to a composition containing the inventive compounds, and thus need not be separated from the polyamides of formula (1) in order for a suitable ink jet resin to be formed therefrom. For convenience, the word "composition" will be used below to refer to the material that is useful in an ink jet ink, although it must be recognized that a single purified compound of formula (1) might also be useful in the ink, so long as it has the properties desired in the compositions described below.

In one composition of the invention, compounds of formula (1) wherein n is 1–5 constitute at least 50 mol %, preferably at least 75 mol %, more preferably at least 90 mol %, and still more preferably at least 95 mol %, based on all of the compounds of formula (1) in the composition regardless of the value for n, ie., allowing n to assume any value. In general, as the composition contains a greater proportion of compounds of formula (1) having n greater than 5, the composition demonstrates a higher viscosity than is typically suitable for ink jet printing. In another composition of the invention, compounds of formula (1) wherein n is 1–5 constitute at least 50 wt %, preferably at least 75 wt %, more preferably at least 90 wt %, and still more preferably at least 95 mol % of those compounds of formula (1) present in the composition wherein n may assume any integer.

The average molecular weight of a composition containing a plurality of compounds of formula (1) is a reflection of the number of repeating units in an "average" compound formula (1) present in the composition. In one embodiment, the total of the compounds of formula (1) in an inventive composition have a peak molecular weight, as measured by gel permeation chromatography using polystyrene standards, of less than 8,000, or less than 5,000, or less than 3,000, or less than 2,000. In these compositions, the weight average molecular weight of the total of the polyamide compounds of formula (1) is typically less than 10,000, and in various embodiments, is less than 8,000, less than 6,000, or less than 4,000.

In another embodiment, the invention provides compositions including a plurality of compounds of formula (1), the composition having a peak molecular weight, as measured by gel permeation chromatography using polystyrene standards, of less than 8,000, or less than 5,000, or less than 3,000, or less than 2,000. According to this embodiment, the weight average molecular weight of the composition is less than 10,000, or less than 8,000, or less than 6,000, or less than 4,000.

In order to be useful in a hot-melt ink, a composition of the invention should typically be a solid at room temperature and have a melting point below the operating temperature of the printing equipment which is used to apply the molten ink (prepared from compound(s) of formula (1)) to a substrate. When the inventive composition is used in jet ink printing with conventional printing equipment, the composition typically has a melting point of from about 40° C. to about 150° C., preferably about 60° C. to about 140° C., and more preferably about 80° C. to about 130° C. The melting point can be measured by, e.g., the dropping point device sold by Mettler-Toledo International, Inc. (CH-8606 Greifensee, Switzerland; http://www.mt.com) as their Model FP83HT Dropping Point Cell. The melting point of the composition may be varied upon variation of the identities of $R^1$, $R^2$, $R^3$ and n in formula (1) as explained herein.

When molten, the inventive composition preferably has a viscosity, commonly termed a "melt viscosity", which is suitable for a component of a hot-melt ink. Again, the melt viscosity of the inventive composition can be varied by proper selection of the identities of $R^1$, $R^2$ and $R^3$. For incorporation into a jet ink being applied by conventional equipment, the composition should typically have a melt viscosity of less than about 300 centipoise (cP) at 150° C., and preferably has a melt viscosity of less than about 100 cP at 130° C. Melt viscosity can be conveniently measured using the Model RVTD Digital Viscometer from Brookfield Engineering Laboratories (Middleboro, Mass.; http://www.brookfieldengineering.com).

Phase-change inks are preferably non-tacky at room temperature or even slightly elevated temperatures as might be experienced when printed materials are transported in hot weather by truck or rail. Thus, the polyamide of the present invention is preferably non-tacky under the same conditions. Non-tacky polyamides can be prepared according to the invention disclosed herein. Another preferred feature of the polyamide of formula (1) is that it is colorless. However, black hot-melt inks are commercially desirable, so colored polyamides, e.g., amber or hazy compounds, and compositions containing a plurality of compounds, are also useful. Furthermore, preferred polyamides are hard and are not oily.

Compounds of the present invention may be prepared by reacting together reactants including monocarboxylic acid of the formula $R^1$—COOH, diamine of the formula $H_2N$—$R^2$—$NH_2$, and dicarboxylic acid of the formula HOOC—$R^3$—COOH, or reactive equivalents thereof.

The monocarboxylic acid of the formula $R^1$—COOH contains, in total, at least 18 carbons. The $R^1$ group is saturated, i.e., it does not contain any double or triple bonds. The $R^1$ group preferably has a straight-chain segment of at least 16 carbons, i.e., a segment of the formula $(CH_2)_n$ where n is 16. $R^1$ may have more than 17 carbons, and in fact may have as many as about 70 carbons.

Exemplary monocarboxylic acids of the formula $R^1$—COOH include, without limitation, stearic acid ($C_{18}$), 1-eicosanoic acid ($C_{20}$), 1-docosanoic acid ($C_{22}$, also known as behenic acid), dotriacontanoic acid ($C_{32}$), tetratriacontanoic acid ($C_{34}$), pentatriacontanoic acid ($C_{35}$), tetracontanoic acid ($C_{40}$), tetraacontanoioc acid ($C_{44}$), dopentaacontanoic acid ($C_{54}$), tetrahexaacontanoic acid ($C_{64}$), dohexaacontanoic acid ($C_{72}$), etc. These monocarboxylic acids are available from many commercial suppliers, including Aldrich Chemical (Milwaukee, Wis.; www.sigma-aldrich.com).

Another suitable monocarboxylic acid is the oxidized (specifically, carboxyl terminated) polyethylene materials sold by Baker-Petrolite (Sugar Land, Tex.; www.bakerhughes.com/bapt/; division of Baker Hughes; www.bakerhughes.com) as their UNICID™ acids. UNICID™ acids are fully saturated, linear carboxylic acids with average carbon chain lengths ranging from C24 to C50. Acid values for UNICID™ acids vary from 60 to 115.

Still another suitable monocarboxylic acid is the alpha-branched carboxylic acids prepared by oxidizing higher molecular weight Guerbet alcohols. Such products are available from Jarchem Industries Inc. (Newark, N.J.; wwwjarchem.com) as their JARIC™ acids. JARIC™ I-36 acid is a suitable monocarboxylic acid for the present invention.

Small amounts of so-called co-acid, i.e., monocarboxylic acid not falling meeting the criteria of $R^1$—COOH, may be used to prepare a polyamide according to the present invention. Exemplary co-acid has less than 18 carbons,,for example 16, 14, 12, 10, etc. carbons, and may be aliphatic or aromatic, but is preferably aliphatic. Other exemplary co-acid has 18 or more carbons, however the co-acid contains at least one site of unsaturation, i.e., at least one double bond. In the context of co-acid, "small amounts" means less than 50% of the monocarboxylic acid equivalents used to prepare a polyamide of the present invention are contributed by the co-acid, and preferably less than 30%, less than 20%, less than 10%, less than 5%, and essentially no co-acid is used. Thus, monocarboxylic acid R¹—COOH preferably provides the majority of the monocarboxylic acid reactant used in the preparation of a polyamide of the present invention, and preferably contributes at least 70%, or at least 80%, or at least 90%, or at least 95%, or essentially all of the monocarboxylic acid reactants.

Exemplary diamine of the formula H₂N—R²—NH₂ is available from Huntsman Chemical Co. (Houston, Tex.; http://www.huntsman.com) as their JEFFAMINE™ diamine product line. JEFFAMINE diamines may be selected on the basis of the R² group(s), which are typically selected from CH₂—CH₂—O (i.e., ethyleneoxy) and CH(CH₃)—CH₂—O (i.e., propyleneoxy) groups. They may also be selected on the basis of molecular weight, which typically ranges from 200–2000. Suitable diamines available from Huntsman Chemical Co. include JEFFAMINE™ D-230 polyoxypropylenediamine (R² is

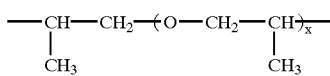

where x represents a number of oxypropylene units and is, on average, 2.6; average molecular weight of approximately 230), JEFFAMINE™ D-400 polyoxypropylenediamine (R² is

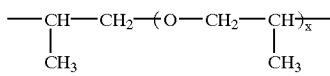

where x is, on average, 5.6; average molecular weight of approximately 400); JEFFAMINE™ D-2000 (R² is

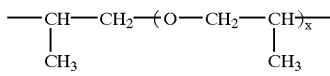

where x is, on average, 33.1; average molecular weight of approximately 2,000) and Huntsman's XTJ-500 poly(oxyethylene)diamine (where R² is

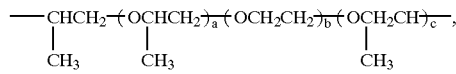

wherein b represents a number of oxyethylene units and is, on average, 39.5, a+c represent the number of oxypropylene units in the R² group and is, on average 5.0, and XTJ-500 has an approximate molecular weight of 2000).

Small amounts of so-called co-diamine, i.e., diamine not meeting the criteria of H₂N—R²—NH₂, may be used to prepare a polyamide according to the present invention. Exemplary co-diamine is an aliphatic diamine, i.e., a diamine of the formula of H₂N—R²ᵃ—NH₂, wherein R²ᵃ is a saturated hydrocarbon diradical. Aliphatic diamines include ethylene diamine (EDA), 1,6-hexamethylenediamine (HMDA), 2-methylpentamethylenediamine (MPMD, available from DuPont, Wilmington, Del.; www.dupont.com; as their tradename DYTEK™ A amine); xylene diamine, 1,2-propanediamine, and 1,12-dodecanediamine. Each of these co-diamines is commercially available from, e.g., Aldrich (Milwaukee, Wis.).

In the context of co-diamine, "small amounts" means less than 50% of the amine equivalents used to prepare a polyamide of the present invention are contributed by the co-diamine, and preferably less than 30%, less than 20%, less than 10%, less than 5%, and essentially no co-diamine is used. Thus, diamine of the formula H₂N—R²—NH₂ preferably provides the majority of the diamine reactant used in the preparation of a polyamide of the present invention, and preferably contributes at least 70%, or at least 80%, or at least 90%, or at least 95%, or essentially all of the diamine reactants.

Exemplary diacid of the formula HOOC—R³—COOH is cyclohexane dicarboxylic acid, and specifically 1,4-cyclohexane dicarboxylic acid having the formula

1,4-Cyclohexane dicarboxylic acid may be in either the cis

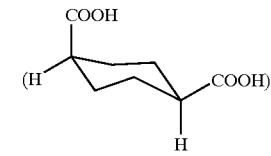

or

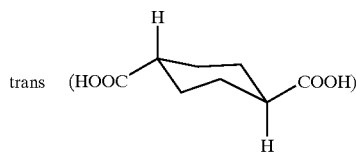

isomeric form.

Either isomer, or any mixture of these isomers, may be used in the preparation of a polyamide of the present invention. For example, Eastman (Kingsport, Tenn.; www.eastman.com) sells EASTMAN 1,4-CHDA-HP™ high purity 1,4-cyclohexanedicarboxylic acid, which is a white powder having a melting point of 165° C. and a cis isomer content of 80 wt. % (based on total weight of cis and trans diacid), that may be used to provide 1,4-cyclohexane dicarboxylic acid to the present reaction. 1,4-cyclohexane dicarboxylic acid is also available in various grades and purities from Aldrich (Milwaukee, Wis.). The cisoid stereoisomer of 1,4-cyclohexanedicarboxylic acid generally provides for a polymer of the invention having a harder consistency in comparison to the polymer formed from the transoid 1,4-cyclohexanedicarboxylic stereoisomer.

Another exemplary diacid of the formula HOOC—R³—COOH has a benzene nucleus for R³. Such acids include phthalic acid, isophthalic acid and terephthalic acid, as well as alkyl-substituted derivatives thereof. These acids often sublime when heated to a convenient temperature for polyamide formation, and so, for convenience, reactive equivalents of these acids are preferably used in the polymer synthesis, where reactive equivalents include the corresponding esters, e.g., dimethyl terephthalic acid, or the corresponding acid chlorides, e.g., terephthaloyl chloride (CAS Registry Number 100-20-9).

Small amounts of so-called co-diacid, i.e., diacid not meeting the criteria of HOOC—R³—COOH, may be used to prepare a polyamide according to the present invention. Exemplary co-diacid contains 4–40 carbons, where these carbons may be linear, branched, cyclic, acyclic, aliphatic or aromatic. Exemplary co-diacids include, without limitation, dodecandioic acid, 1,6-hexanedioic acid (adipic acid), 1,7-heptanedioic acid (pimelic acid), 1,8-octanedioic acid (suberic acid), 1,9-nonanedioic acid (azelaic acid), 1,10-decanedioic acid (sebacic acid), 1,11-undecanedoic acid, 1,12-dodecanedioic acid (1,10-decanedicarboxylic acid), 1,13-tridecanedioic acid (brassylic acid) and 1,14-tetradecanedioic acid (1,12-dodecanedicarboxylic acid). Such co-diacids are available from, e.g., Aldrich Chemical.

Another exemplary co-diacid for use in the present invention is the reaction product of acrylic or methacrylic acid (or the ester thereof, with a subsequent hydrolysis step to form an acid) and an unsaturated fatty acid. For example, a $C_{21}$ diacid of this type may be formed by reacting acrylic acid with a $C_{18}$ unsaturated fatty acid (e.g., oleic acid), where an ene-reaction presumably occurs between the reactants. An exemplary $C_{21}$ diacid is commercially available from Westvaco Corporation, Chemical Division (Charleston Heights, S.C.; http://www.westvaco.com), as their product number 1550.

In the context of co-diacid, "small amounts" means less than 50% of the diacid equivalents used to prepare a polyamide of the present invention are contributed by the co-diacid, and preferably less than 30%, less than 20%, less than 10%, less than 5%, and essentially no co-diacid is used. Thus, diacid of the formula HOOC—$R^3$—COOH preferably provides the majority of the diacid reactant used in the preparation of a polyamide of the present invention, and preferably contributes at least 70%, or at least 80%, or at least 90%, or at least 95%, or essentially all of the diacid reactants.

Preferably, dimer acid, i.e., the polymerization product of unsaturated fatty acid, e.g., tall oil fatty acid (TOFA), contributes less than 20% of the diacid equivalents in a reaction mixture to prepare a polyamide of the present invention. More preferably, dimer acid contributes less than 10%, or less than 5% or essentially none of the carboxylic acid equivalents used to prepare a polyamide of the present invention. Several U.S. patents disclose the desirability of incorporating dimer acid into an ink resin/binder (see, e.g., U.S. Pat. No. 4,066,585 to Schepp et al., and U.S. Pat. No. 4,830,671 to Frihart et al.), however, in a preferred embodiment, the resins of the present invention do not contain any dimer acid, or residue resulting from reaction of dimer acid. The incorporation of dimer acid into a polyamide of the present invention typically lowers the softening point of the resin, and provides a resin of such high softness, that it is not suitably employed as a component in phase change inks. Accordingly, dimer acid is preferably not among the reactants used to prepare a polymer of formula (1).

Reactive equivalents of diacids and co-diacids, diamine and co-diamines, and monocarboxylic acids and co-acids, may be used in the practice of the present invention. For example, diesters may be substituted for some or all of the diacid/co-diacid, where "diesters" refer to the esterification product of diacid/co-diacid with hydroxyl-containing molecules. However, such diesters are preferably prepared from relatively volatile hydroxyl-containing molecules, in order that the hydroxyl-containing molecule may be easily removed from the reaction vessel subsequent to diamine reacting with the diester. A lower alkyl diester, e.g., the esterification or diesterification product of diacid/co-diacid as defined herein and a $C_{1-4}$ monohydric alcohol (e.g., methanol, ethanol, propanol and butanol), may be used in place of some or all of the diacid/co-diacid in the polyamide-forming reaction of the invention. The acid halide of the diacid/co-diacid may likewise be employed in place of some or all of the diacid/co-diacid, however such a material is typically much more expensive and difficult to handle compared to the diacid/co-diacid, and thus the diacid/co-diacid is preferred. While such reactive equivalents may be employed in the reaction, their presence is not preferred because such equivalents introduce undesired reactive groups into the reaction vessel.

As described herein, monocarboxylic acid of formula $R^1$—COOH (including minor amounts of co-acid), diamine of formula $H_2N$—$R^2$—$NH_2$ (including minor amounts of co-diamine) and dicarboxylic acid of formula HOOC—$R^3$—COOH (including minor amounts of co-diacid) are preferred starting materials to form the compounds and compositions of the present invention. These starting materials are preferably reacted together with a stoichiometry, and under reaction conditions, such that the acid number of the resulting reaction product is less than 25, preferably less than 15, and more preferably less than 10, while the amine number is preferably less than 10, more preferably less than 5, and still more preferably less than 1. The progress of the reaction may be monitored by periodically withdrawing samples and measuring the acid number of the samples. Techniques to measure an acid number are well known in the art. See, e.g., ASTM D-465 (1982). Typically, a 4–8 hour reaction time at about 200–220° C. can provide a polyamide including compounds of formula (1) having an acid number of less than about 25.

To prepare a polyamide of the invention, the acid(s), diamine(s) and diacid(s) are reacted together. As used herein, "reacted together" means to combine the reactants to form a reaction mixture, and maintain this mixture at an elevated temperature to achieve polyamide formation. Any order of combination is suitable, and heating rate is not particularly important. The final heating temperature is suitably about 150° C. to about 250° C. At temperatures below about 150° C., the rate of product formation is undesirably slow, while temperatures above about 250° C. can cause some reactant and/or product degradation, resulting in dark colored product.

Upon heating, water vapor will be evolved as the amidification reaction occurs. Preferably, the water vapor is condensed and removed from the reaction mixture as soon as it forms, thus driving the reaction to completion. A gentle flow of an inert gas, nitrogen for example, may be passed through the reaction flask in order to facilitate removal of the water vapor. Alternatively, the water vapor is removed by application of a modest vacuum of about 20–200 mtorr, or by co-distillation of an inert process solvent (e.g., co-distillation of xylene) with use of a Dean Stark trap.

A catalyst may be used to speed up the amidification reaction, where suitable catalysts are well known in the art and include sulfuric acid, phosphoric acid and other inorganic acids, metal hydroxides and alkoxides such as tin oxide and titanium isopropoxide, and divalent metal salts such as tin or zinc salts. When a catalyst is present, it should be used in small amounts, e.g., less than about 5 weight percent of the total mass of the reaction mixture, preferably less than about 2% and more preferably less than about 1% of the total mass of the reaction mixture. Excessive amounts of catalyst increase the cost of preparing the polyamide, as well as often leave behind residue that may be harmful to the environment in which hot-melt ink is placed, e.g., a printhead.

Thus, the present invention provides a composition prepared by a process that includes the step of reacting together various reactants to provide a reaction mixture, where those reactants include monocarboxylic acid or reactive equivalent thereof, diamine or reactive equivalent thereof, and dicarboxylic acid or reactive equivalent thereof. The relative amounts of the reactants, and the duration of the reaction period, should be such that the resulting composition has an acid number of less than 25. In order to be used in printing, the composition should be placed in admixture with an image-forming component.

It is important to control the stoichiometry of the reactants in order to prepare polyamide according to the present invention. In the following discussion regarding reactant stoichiometry, the terms "equivalent(s)" and "equivalent percent" will be used, and are intended to have their standard meanings as employed in the art. However, for additional clarity, it is noted that equivalents refer to the number of reactive groups present in a molar quantity of a molecule, such that a mole of a dicarboxylic acid has two equivalents of carboxylic acid, while a mole of diamine has two equivalents of amine. Furthermore, it is emphasized that the diacid has primarily only two reactive groups (both carboxylic acids), the monocarboxylic acid has only one reactive group (a carboxyl group) and the diamine has two reactive groups (both primary amine groups), and these are preferably, although not necessarily, the only reactive materials present in the reaction mixture. The ether groups of the polyalkyleneoxy groups are considered to be inert under the polyamide-forming reaction conditions typically employed herein.

According to the invention, is it preferred that the equivalents of carboxylic acid (from acid and diacid) are substantially equal to the equivalents of amine contributed by diamine. In other words, if the reaction mixture used to form an polyamide has "x" equivalents of carboxylic acid from monoacid, and "y" equivalents of carboxylic acid from diacid, and "z" equivalents of amine from diamine, then $0.9 \leq \{z/(x+y)\} \leq 1.1$, and preferably $\{z/(x+y)\}$ is substantially 1.0. In another aspect, the total number of amine equivalents is within 10% of the total number of acid equivalents in a reactant mixture used to prepare a compound of formula (1). Under these conditions, substantially all of the carboxylic acid groups will react with substantially all of the amine groups, so that the final product contains very little unreacted carboxylic acid, or amine groups. In other words, each of the acid and amine numbers of a composition containing a plurality of compounds of the invention is preferably less than about 25, is more preferably less than about 15, and is more preferably less than about 10, and is still more preferably less than about 5.

When co-diacid and/or co-diamine is employed to prepare a polyamide of the present invention, the co-diacid preferably contributes no more than about 50% of the equivalents of carboxylic acid present in the reaction mixture, and the co-diamine preferably contributes no more than about 50% of the equivalents of the amine present in the reaction mixture. Stated another way, the co-diacid contributes from 0–50 equivalent percent of the acid equivalents in the reaction mixture. Preferably, the co-diacid contributes 0–30 equivalent percent, and more preferably contributes 0–10 equivalent percent of the acid equivalents in the reaction mixture. Likewise, the co-diamine contributes from 0–50 equivalent percent of the amine equivalents in the reaction mixture. Preferably, the co-diamine contributes 0–30 equivalent percent, and more preferably contributes 0–10 equivalent percent of the amine equivalents in the reaction mixture.

In order to prepare the composition of the invention, it is important to control the relative equivalents of carboxyl derived from monocarboxylic acid and dicarboxylic acid. The ratio of equivalents of mono-acid to di-acid should be in the range of about 0.25 to 1.0. A preferred amount of mono-acid is 33% of the total of the acid equivalents, i.e., a ratio of mono-acid to di-acid of 0.5.

As the relative equivalents of carboxylic acid from monoacid is increased (all other factors staying constant), the average molecular weight (both number and weight average) of a composition containing a plurality of polyamide compounds will decrease, while the average molecular weight increases as the equivalents of carboxylic acid from monoacid is decreased. The incorporation of more difunctional reactants (ie., more diacid or more diamine), while maintaining a constant amount of monofunctional reactant (i.e., monocarboxylic acid) will cause the average molecular weight of the composition to increase. Accordingly, the stoichiometry of the reactants will have a significant impact on the properties of the polyamide-containing composition.

Contrary to the situation for most polymeric species, the end groups in admixtures of compounds of the invention have a significant impact on the properties of the admixture. The end-groups of the compounds of formula (1), which include linear portions and are formed from hydrocarbon (as required by the definition of $R^1$), will impart crystallinity to the admixture, and will tend to increase the hardness thereof. According, as more end groups are present in the admixture, i.e., as the admixture's average molecular weight decreases, the hardness of the admixture will increase. High hardness is generally desired in a polyamide for phase-change printing so that the printed ink containing the polyamide is not tacky.

Decreasing the average molecular weight will cause the admixture to have a lower melt viscosity, which is desirable for a phase change ink. However, higher amount of termination also contributes to a lower melting point of the polyamide, which is undesirable if the melting point falls to below about 50° C. The melting point of the polyamide will generally increase as the size, i.e., carbon number, of the end group increases. Accordingly, $R^1$ groups having at least 17 carbons, and preferably more than 17 carbons, are incorporated into polyamides of the present invention.

A preferred polyamide of the invention is at least partially transparent, and thus does not interfere with, taint or mask the appearance of the colorant or other image-forming component in the ink. Furthermore, preferred polyamides are hard, are not oily, and are non-tacky.

Another aspect of the invention is a hot-melt ink composition comprising an image-forming component and a polyamide of formula (1) as described above. The image-forming component is a material that may be detected or observed by any means. A colorant is a preferred image-forming component, where colorants may be visually detected by the human eye, or by an optical character reading device. Both dyes and pigments are suitable colorants, where extensive lists of specific dyes and pigments suitable for use in the hot-melt ink of the present invention are set forth in both of U.S. Pat. Nos. 5,286,288 and 5,122,187, where the disclosures of these two patents are incorporated herein in their entireties.

Alternatively, the image-forming component may be a magnetic material that can be scanned by a suitable reader, or a fluorescent material that can be detected upon exposure to specific wavelengths of light. While in rare instances the carrier itself may serve as an image-forming component, it is more typically the case that the carrier is a transparent material that functions primarily to suspend and disperse the image-forming component at elevated temperatures, and then helps to fix the image-forming component to a substrate after printing.

The carrier typically constitutes about 0.5 to about 97 weight percent of the hot-melt ink composition, and preferably about 80–97 weight percent of the ink composition. The image-forming component typically constitutes about 0.1–3 weight percent, preferably about 0.3–2 weight percent of the hot-melt ink composition.

The hot-melt ink composition of the invention may contain ingredients in addition to colorant and polyamide of formula (1). For example, when the hot-melt ink is used in continuous jet ink printing, the ink may contain an electrolyte. When containing an electrolyte, the hot-melt ink may be induced to carry a charge, and droplets of charged hot-melt ink may be directed to either a substrate for printing, or a gutter for recycling, by adjustment of an electrostatic field through which the charged ink particles must pass. A suitable electrolyte for the hot-melt ink composition of the invention is an inorganic salt, as disclosed in, e.g., U.S. Pat. No. 5,286,288. When the electrolyte is an inorganic salt, an electrolyte-solvating and dissociating compound, as also disclosed in the '288 patent, is preferably present in the hot-melt ink composition.

Other ingredients that may be present in the hot-melt ink composition of the invention include one or more of a corrosion inhibitor, biocide, plasticizer, tackifier, surfactant, dispersing agent, antioxidant, rheology modifier and UV stabilizer. A volatile solvent, e.g., a solvent having a boiling point of less than 150° C., is preferably not among the components of the ink composition, or any composition that includes a polyamide of the present invention.

Accordingly, the present invention provides a composition that includes an image-forming agent and a compound of formula (1):

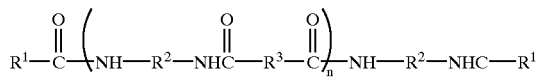

(1)

wherein, in at least one occurrence, $R^1$ is an alkyl group having at least seventeen carbons; $R^2$ includes a polyalkyleneoxide; $R^3$ includes a C6 carbocyclic group (iLe., a ring formed from exactly six carbons and no other atoms); and n is an integer of at least 1. In a preferred embodiment, $R^1$ is an alkyl group having at least seventeen carbons wherein at least 16 of those at least seventeen carbons form a straight chain. In a preferred embodiment, $R^2$ includes ethyleneoxy (—CH$_2$CH$_2$O—) and/or methyl-substituted ethyleneoxy (i.e., propyleneoxy) units. In a preferred embodiment, $R^3$ includes a saturated C6 carbocyclic group, where the carbocyclic group is preferably joined to flanking carbonyl groups at the 1 and 4 positions of the C6 carbocyclic group.

Hot-melt ink compositions of the present invention may generally be prepared simply by combining the desired ingredients to form a mixture, and heating the mixture with stirring to form a molten homogeneous composition which is the hot-melt ink composition. A temperature in the range of about 90° C. to about 150° C. is typically adequate to achieve a homogeneous composition after a stirring time of about 15 minutes to about 1 hour. It is also possible to melt one component of the ink, e.g., the carrier, and then add other components with stirring. When pigment is included in the hot-melt ink composition, then it may be necessary to grind the mixture of ingredients to effect a uniform dispersion of the pigment in the ink. Grinding may suitably be accomplished with a ball mill or an atritor.

As used herein, the terms "hot-melt ink" and "phase-change ink" denote ink that is a solid at room temperature and a liquid at the operating temperature of the printer employing the hot-melt ink. Typical printers for hot-melt inks heat the ink to about 110° C. to about 130° C. The hot-melt ink of the invention thus has a viscosity of about 1 centipoise (cP) to about 50 cP at a temperature of about 75° C. to about 175° C., more preferably has a viscosity of about 2 cP to about 20 cP at a temperature of about 90° C. to about 150° C., and still more preferably has a viscosity of about 5 cP to about 15 cP at a temperature of about 110° C. to about 130° C. In a preferred embodiment, the ink composition includes a polyamide as described above that is free of solvent having a boiling point of less than 150° C.

The hot-melt ink of the invention may be used to print on a wide variety of substrates, which may be porous or non-porous. Exemplary substrates include plastics, plastic laminates, glass, metal, paper, wood, etc. The ink may be used in drop-on-demand and continuous ink jet printers, where these printers are commercially available from many sources.

Thus, in one aspect, the invention provides a method of printing which includes the step of contacting a substrate with an ink, where the ink includes an image-forming component and a compound of formula (1),

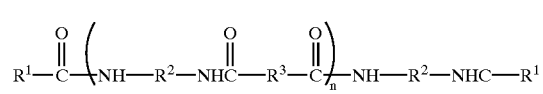

(1)

wherein, in at least one occurrence, $R^1$ is an alkyl group having at least seventeen carbons; $R^2$ includes a polyalkyleneoxide; $R^3$ includes a C6 carbocyclic group (i.e., a ring formed from exactly six carbons and no other atoms); and n is an integer of at least 1. In a preferred embodiment, $R^1$ is a saturated hydrocarbon wherein at least 16 of those at least seventeen carbons form a straight chain. In a preferred embodiment, $R^2$ includes ethyleneoxy (—CH$_2$CH$_2$O—) and/or methyl-substituted ethyleneoxy (i.e., propyleneoxy) units. In a preferred embodiment, $R^3$ includes a saturated C6 carbocyclic group, where the carbocyclic group is preferably joined to flanking carbonyl groups at the 1 and 4 positions of the C6 carbocyclic group. The contacting step may be achieved by, for example, jetting the ink from a reservoir to a substrate, where suitable substrates are paper and polyester. In one aspect, the ink has a viscosity of less than 150 cP when measured at 130° C.

The phase-change ink may also be used in gravure and intaglio printing. To achieve such printing with phase-change ink, phase-change ink as described above is melted and the molten ink stored in a reservoir. A printing plate, which is typically warmed to a temperature of greater than or about the same as the melting point of the phase-change ink, is then contacted with the pool of molten phase-change ink. In this way, molten phase-change ink is transferred to a gravure or intaglio printing plate, in essentially the same manner as liquid inks are currently transferred to a printing plate.

The printing plate, having molten phase-change ink thereon, is then contacted with a substrate in order to transfer ink to the substrate in an image-wise fashion. The substrate, which is typically at room temperature, will immediately induce cooling of the phase-change ink, and thereby cause the ink to become fixed to the substrate.

The following examples are set forth as a means of illustrating the present invention and are not to be construed as a limitation thereon.

EXAMPLES

In the following examples, 1,4-cyclohexanedicarboxylic acid was from EASTMAN (Kingsport, Tenn.); JEFFAMINE D400 diamine, JEFFAMINE D230 diamine and Huntsman XTJ-500 poly(oxyethylene/oxypropylene)diamine were from Huntsman Chemical (Salt Lake City, Utah); HYSTRENE stearic acid was from Witco Corporation (Greenwich, Conn.; http://www.witco.com). Softening point was measured on a METTLER dropping point apparatus.

Example 1

A 2 liter, 4-necked reaction flask fitted with an overhead stirrer, thermocouple, nitrogen gas inlet and vapor outlet (to a condenser) was charged with 206.7 g (2.40 acid equivalents) 1,4-cyclohexanedicarboxylic acid and 784.0 g (3.56 amine equivalents) JEFFAMINE™ D400 diamine. This mixture was stirred and heated under a moderate nitrogen stream to 130° C., at which temperature the mixture became homogeneous. To this mixture was then added 0.8 g of 25% aqueous hypophosphorous acid catalyst and, as the mixture continued to heat to 155° C., 343.4 g HYSTRENE 5016 stearic acid (1.28 acid equivalents). The reaction mass was heated over a period of 2 hours to 220° C. over which period of time 53 g of water was collected from the condenser, then held at this elevated temperature for an additional two hours. A sample taken at this stage showed an acid number of 12.8 and an amine number of 2.8. JEFFAMINE D230 diamine (1.20 g) was then added to help reduce the acid-amine spread. The reaction mixture was then placed under a vacuum of about 15 mbar and held 2 hours. The vacuum was then removed and the product poured. Upon cooling, this material turned into a somewhat soft, light tan, translucent solid with a slightly greasy feel. It had an acid number of 10.6, an amine number of 1.0, a Mettler dropping point of 105° C., and a melt viscosity at 130° C. of 84 cP.

Example 2

A flask was charged with 6.59 g 1,4-cyclohexane dicarboxylic acid, 60.1 g UNICID™ 700 and 33.01 g JEFFAMINE™ D400. The mixture was heated to about 200° C. under a nitrogen atmosphere, then placed under vacuum to remove residual water and drive the reaction to a low acid and amine number. The product polyamide was light tan, translucent, hard, and not very flexible. The softening point was 109.6° C.

Example 3

A flask was charged with 12.0 g 1,4-cyclohexanedicarboxylic acid, 40.0 g JARIC™ I-36 monocarboxylic acid, and 45.0 g JEFFAMINE™ D400 diamine. This reaction mixture was heated gradually under a stream of nitrogen to about 220° C. and held until the acid number reached 16. The product was an off-white, hard, non-tacky translucent solid with a dropping point of 117° C. and a melt viscosity of 77 cP.

Example 4

A flask was charged with 8.61 g 1,4-cyclohexanedicarboxylic acid, 17.0 g behenic acid, and 47.0 g Huntsman XTJ-500 poly(oxyethylene/oxypropylene) diamine. This reaction mixture was heated gradually under a stream of nitrogen to about 220° C. and held until the amine number decreased to 1.0. The product was an off-white, slightly soft, hazy, non-tacky solid with an acid number of 6.0, a dropping point of 121° C. and a melt viscosity of 92 cP.

All publications and patent applications mentioned in this specification are herein incorporated by reference to the same extent as if each individual publication or patent application was specifically and individually incorporated by reference.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. A compound of formula (1):

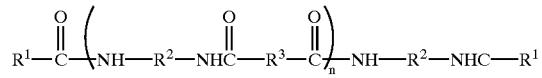

wherein, in at least one occurrence, $R^1$ is an alkyl group having at least seventeen carbons; $R^2$ comprises a polyalkyleneoxide moiety; $R^3$ comprises a C6 carbocyclic group; and n is an integer within the range of 1 to 10, inclusive.

2. A compound according to claim 1 wherein $R^1$ is an alkyl group having at least 21 carbons.

3. A compound according to claim 1 wherein $R^1$ comprises at least 16 contiguous $CH_2$ groups.

4. A compound according to claim 1 wherein $R^1$ has less than about 70 carbons.

5. A compound according to claim 1 wherein $R^2$ comprises units selected from ethyleneoxy, propyleneoxy and butyleneoxy.

6. A compound according to claim 1 wherein $R^2$ has a formula weight of about 200 to 4000.

7. A compound according to claim 1 wherein $R^3$ comprises a C6 saturated carbocyclic group.

8. A compound according to claim 1 wherein $R^3$ is 1,4-cyclohexylene.

9. A compound according to claim 1 wherein n is within the; range of 2 to 10, inclusive.

10. A compound according to claim 1 wherein $R^1$ comprises at least 16 contiguous $CH_2$ groups, $R^2$ comprises ethyleneoxy and/or propyleneoxy moieties, and $R^3$ is 1,4-cyclohexylene.

11. A compound according to claim 1 with the proviso that $R^3$ is not the diradical formed when two carboxyl groups are removed from dimer acid.

12. A compound according to claim 1 wherein $R^1$ is a saturated hydrocarbon having at least seventeen carbons and at least 16 contiguous $CH_2$ groups; $R^2$ is a polyalkyleneoxide with alkylene termination at each of its two ends; $R^3$ is a 1,4-cyclohexylene group; and n is an integer of at least 1.

13. A compound according to claim 1 having a melting point within the range of 50° C. to 150° C.

14. A composition comprising a compound according to claim 1, the composition having an acid number of less than 25, and an amine number of less than 10.

15. A composition comprising a compound according to claim 1, the composition having a viscosity of less than 300 centipoise when the composition is at a temperature of 150° C.

16. A composition comprising a compound according to claim 1, the composition being free of solvent having a boiling point of less than 150° C.

17. A composition comprising a compound according to claim 1 and an image-forming agent.

18. A composition comprising a compound according to claim 1 and a colorant.

19. A process of printing comprising melting a compound according to claim 1 and depositing said compound onto a substrate.

20. A process for preparing a compound of the formula (1)

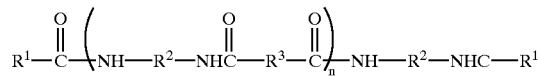
(1)

wherein, in at least one occurrence, $R^1$ is an alkyl group having at least seventeen carbons; $R^2$ comprises a polyalkyleneoxide; $R^3$ comprises a C6 carbocyclic group; and n is an integer within the range of 1 to 10 inclusive; the process comprising combining reactants comprising:

(a) a monoacid compound of the formula $R^1$—COOH, or a reactive equivalent thereof;

(b) a diamine compound of the formula $H_2N$—$R^2$—$NH_2$, or a reactive equivalent thereof;

(c) a diacid compound of the formula HOOC—$R^3$—COOH, or a reactive equivalent thereof; and heating reactants (a), (b) and (c) at a sufficient temperature, and for a sufficient time, to provide a reaction product that comprises a compound of formula (1).

21. The process of claim 20 wherein $R^1$ comprises at least 16 contiguous $CH_2$ groups, $R^2$ comprises alkyleneoxy groups selected from ethyleneoxy, propyleneoxy and butyleneoxy, and $R^3$ is a 1,4-cyclohexylene group.

22. The process of claim 20 with the proviso that dimer acid or a reactive equivalent thereof is not included among the reactants.

23. The process of claim 20 further comprising removing unreacted reactant (a), (b) and /or (c) so that the reaction product has an acid number of less than 25 and an amine number of less than 10.

24. The process of claim 20 wherein the reactants are characterized by a total equivalents of acid and a total equivalents of amine, and the total equivalents of acid are within 10% of the total equivalents of amine.

25. A composition prepared by the process of claim 20.

26. The composition of claim 25 having a viscosity of less than 300 centipoise when the composition is at a temperature of 150° C.

27. A composition of claim 25 comprising a image-forming agent.

* * * * *

UNITED STATES PATENT AND TRADEMARK OFFICE
CERTIFICATE OF CORRECTION

PATENT NO.    : 6,492,458 B1
DATED         : December 10, 2002
INVENTOR(S)   : Mark S. Pavlin It is certified that error appears in the above-identified patent and that said Letters Patent is hereby corrected as shown below:

Title page,
Item [57], ABSTRACT, Columns 3, 4, 17, 18, 20 and 22, the structure of formula (1) should show:

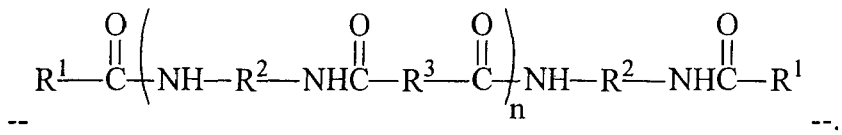
-- --.

Column 20,
Lines 38 and 39, "within the; range" should read as -- within the range --.
Line 53, "50º C. to 150º C" should read as -- 50º C to 150º C --.

Signed and Sealed this

Twelfth Day of August, 2003

JAMES E. ROGAN
*Director of the United States Patent and Trademark Office*